United States Patent
Watanabe et al.

(10) Patent No.: US 12,155,559 B2
(45) Date of Patent: Nov. 26, 2024

(54) COMMUNICATION CONTROL DEVICE, COMMUNICATION CONTROL METHOD, COMMUNICATION CONTROL PROGRAM, AND COMMUNICATION CONTROL SYSTEM

(71) Applicant: Nippon Telegraph and Telephone Corporation, Tokyo (JP)

(72) Inventors: Yuta Watanabe, Musashino (JP); Yuki Takei, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 18/276,484

(22) PCT Filed: Feb. 16, 2021

(86) PCT No.: PCT/JP2021/005762
§ 371 (c)(1),
(2) Date: Aug. 9, 2023

(87) PCT Pub. No.: WO2022/176030
PCT Pub. Date: Aug. 25, 2022

(65) Prior Publication Data
US 2024/0106733 A1    Mar. 28, 2024

(51) Int. Cl.
*H04L 45/24*  (2022.01)
*H04L 45/02*  (2022.01)
*H04L 45/28*  (2022.01)

(52) U.S. Cl.
CPC .............. *H04L 45/24* (2013.01); *H04L 45/04* (2013.01); *H04L 45/28* (2013.01)

(58) Field of Classification Search
CPC .......... H04L 45/24; H04L 45/04; H04L 45/28
See application file for complete search history.

(56) References Cited

U.S. PATENT DOCUMENTS

| | | | |
|---|---|---|---|
| 2015/0009819 A1* | 1/2015 | Mori | H04L 47/12 370/232 |
| 2019/0215190 A1* | 7/2019 | Gao | H04L 12/4675 |
| 2022/0141123 A1* | 5/2022 | Kimura | H04L 43/0882 709/238 |

OTHER PUBLICATIONS

Hinden, "Virtual Router Redundancy Protocol (VRRP)," Network Working Group Request for Comments: 3768, Apr. 2004, 27 pages.

* cited by examiner

*Primary Examiner* — June Sison
(74) *Attorney, Agent, or Firm* — Fish & Richardson P.C.

(57) ABSTRACT

A communication system sets a first priority as a priority of a BGP in a path connecting from a terminal to a terminal through an active system connection unit, sets a second priority lower than the first priority as a priority of a BGP in a path connecting from the terminal to the terminal through the standby system connection unit, and sets a third priority which is lower than the first priority and higher than the second priority as a priority of a BGP in a path connecting the active system connection unit and the standby system connection unit. The communication system discards traffic other than a BGP among traffic from the standby system connection unit to the active system connection unit.

7 Claims, 13 Drawing Sheets

COMMUNICATION CONTROL DEVICE, COMMUNICATION CONTROL METHOD, COMMUNICATION CONTROL PROGRAM, AND COMMUNICATION CONTROL SYSTEM

CROSS-REFERENCE TO RELATED APPLICATIONS

This application is a National Stage application under 35 U.S.C. § 371 of International Application No. PCT/JP2021/005762, having an International Filing Date of Feb. 16, 2021.

The disclosure of the prior application is considered part of the disclosure of this application, and is incorporated by reference in its entirety into this application.

TECHNICAL FIELD

The present invention relates to a communication control device, a communication control method, a communication control program, and a communication control system.

BACKGROUND ART

Conventionally, in a network of a communication carrier, an inter-network connection function of the network has been made redundant by an active system device and a standby system device in preparation for a failure. Furthermore, the inter-network connection function is also connected to a terminal of a subscriber accommodated in the network by a redundant path.

CITATION LIST

Non Patent Literature

[NPL 1] IETF RFC3768 VRRP (https://tools.ietf.org/pdf/rfc3768.pdf)

SUMMARY OF INVENTION

Technical Problem

However, the conventional redundant network has a problem that the band may be used in an unauthorized manner.

When a failure occurs in a redundant network, system switching is performed by dynamic routing such as a border gateway protocol (BGP) or by an instruction to a corporation base and an inter-network connection function.

On the other hand, depending on the setting of the standby system device and the active system device by the subscriber, the bands of both systems may be used regardless of the occurrence of a failure.

Solution to Problem

In order to solve the above-mentioned problems and achieve the object, a communication control device includes: a setting unit that sets a first priority as a priority of a border gateway protocol (BGP) in a path connecting from a first terminal to a second terminal through an active system connection unit, sets a second priority lower than the first priority as a priority of a BGP in a path connecting from the first terminal to the second terminal through a standby system connection unit, and sets a third priority which is lower than the first priority and higher than the second priority as a priority of a BGP in a path connecting the active system connection unit and the standby system connection unit; and a discarding unit that discards traffic other than a BGP among traffic from the standby system connection unit to the active system connection unit.

Advantageous Effects of Invention

According to the present invention, it is possible to prevent the band of the redundant network from being used in an unauthorized manner.

DESCRIPTION OF EMBODIMENTS

Embodiments of a communication control device, a communication control method, a communication control program, and a communication control system according to the present application will be described in detail below with reference to the drawings. Note that the present invention is not limited by the embodiments described below.

Figure 1:
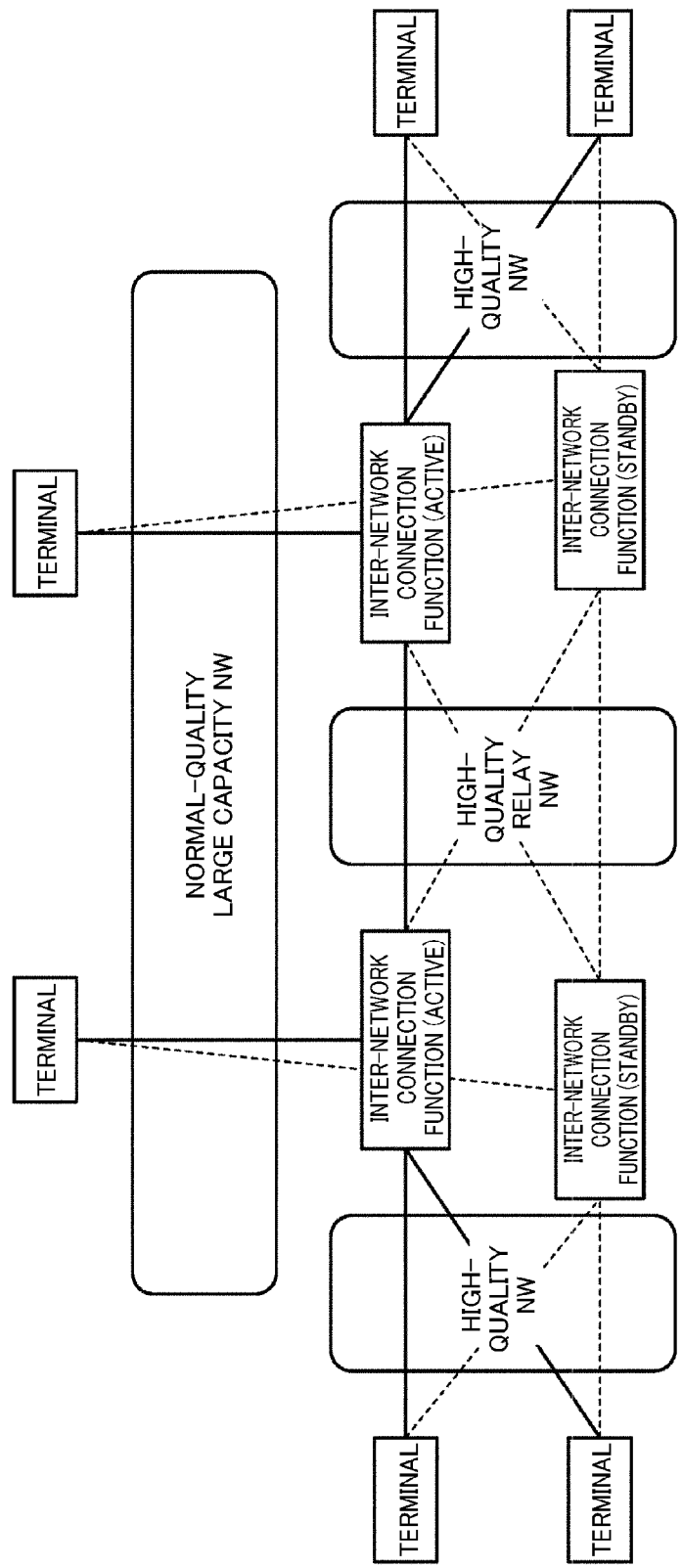
FIG. 1 is a diagram showing an example of a configuration of an entire service.

One of the purposes of the present embodiment is to prevent unauthorized use of a band in providing a communication service as shown in FIG. 1. FIG. 1 is a diagram showing an example of a configuration of an entire service.

In the example shown in FIG. 1, a specific subscriber (for example, a corporation) has a plurality of bases, and the bases are connected by a VPN. The connection requirements of the network are different depending on the base, and there are various bases such as a base connected to a high-speed and high-quality NW and a base connected to a normal-quality NW.

Furthermore, each base connected to a different network is interconnected using an inter-network connection function. In particular, a connection base using a high-quality NW makes a contract by band designation, and communication exceeding a contract band cannot be performed in principle. Also, the inter-network connection function is made redundant by an active system device and a standby system device in preparation for a failure.

Hereinafter, an active system device for realizing the inter-network connection function will be referred to as an active system connection unit. In addition, a standby system device for realizing the inter-network connection function will be referred to as a standby system connection unit. For example, the active system connection unit and the standby system connection unit may be a communication device such as a router.

The active system connection unit and the standby system connection unit may be realized as one device. For example, the active system connection unit and the standby system connection unit may be provided in one device as virtual routers, respectively. Also, the active system connection unit and the standby system connection unit may be different devices, respectively.

[Conventional Redundant Network]

First, problems of the conventional redundant network will be described. In a conventional redundant network, as a system switching method, a method of autonomously performing switching at the time of failure detection using dynamic routing such as a BGP or a method of instructing a terminal or a standby system to perform switching to an inter-network connection function as soon as a failure is detected by a path control device is employed.

Figure 10:
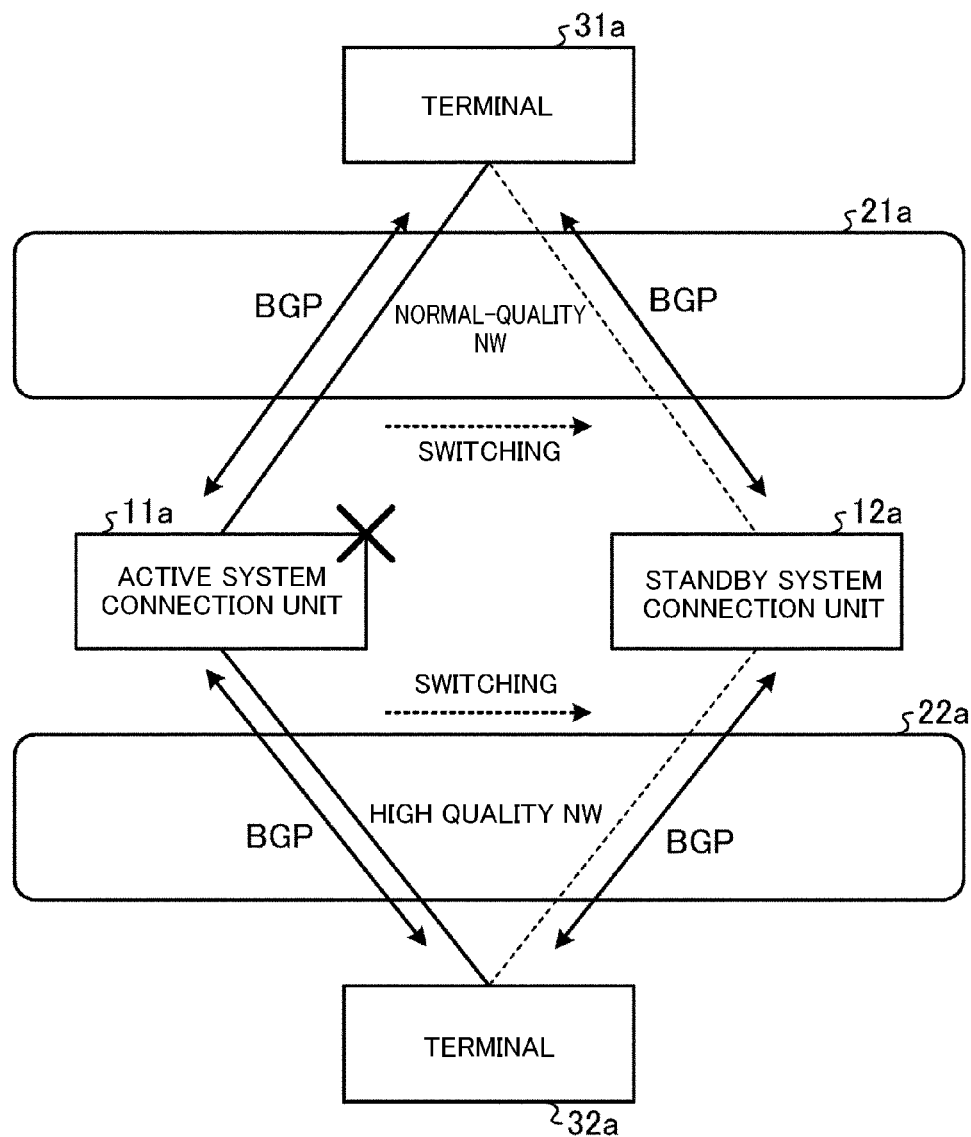
FIG. 10 is a diagram showing a conventional communication control system.

FIG. 10 is a diagram showing a conventional communication control system. As shown in FIG. 10, a terminal 31$a$ and a terminal 32$a$ are communicatively connected via a normal-quality NW (network) 21$a$ and a high-quality NW 22$a$. The normal-quality NW 21$a$ and the high-quality NW 22$a$ are connected via an active system connection unit 11$a$ or a standby system connection unit 12$a$.

In the example shown in FIG. 10, system switching is performed by a BGP when a failure occurs. For example, as shown in FIG. 10, when a failure occurs in a path passing through the active system connection unit 11$a$, the path passing through the standby system connection unit 12$a$ is validated by a BGP.

Figure 11:
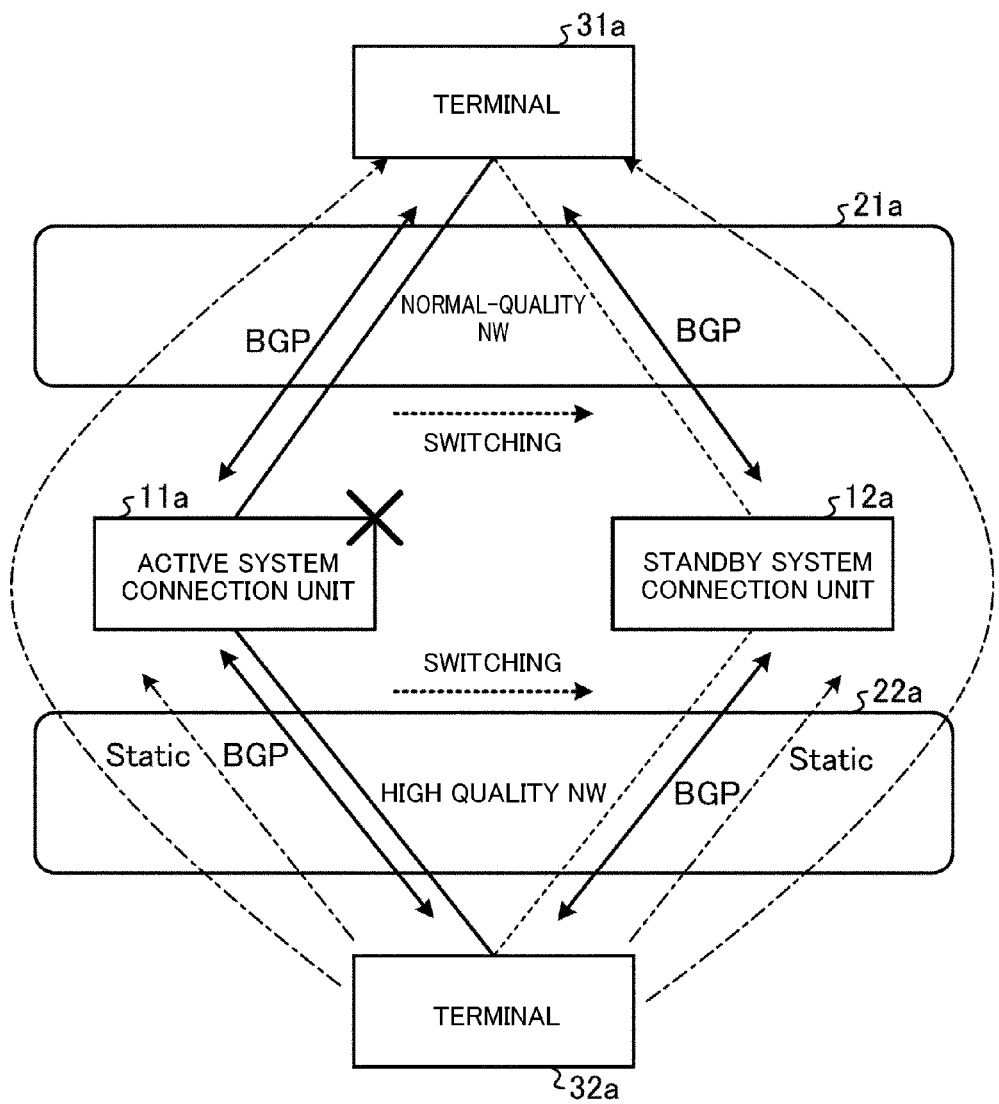
FIG. 11 is a diagram showing a conventional communication control system.

Here, the terminals 31$a$ and 32$a$ are devices owned by the subscriber and the subscriber himself/herself can change the setting. Thus, as shown in FIG. 11, the subscriber can use a maximum of twice the contract band on the high-quality NW 22$a$ by setting the static distribution of communication to the standby system connection unit 12$a$ even when no failure occurs. FIG. 11 is a diagram showing a conventional communication control system.

In order to prevent this, when the interface of the standby system connection unit 12$a$ is closed, it is necessary to perform the closing release after the failure detection, and therefore, it takes time to perform the autonomous detour processing at the time of the failure.

Figure 12:
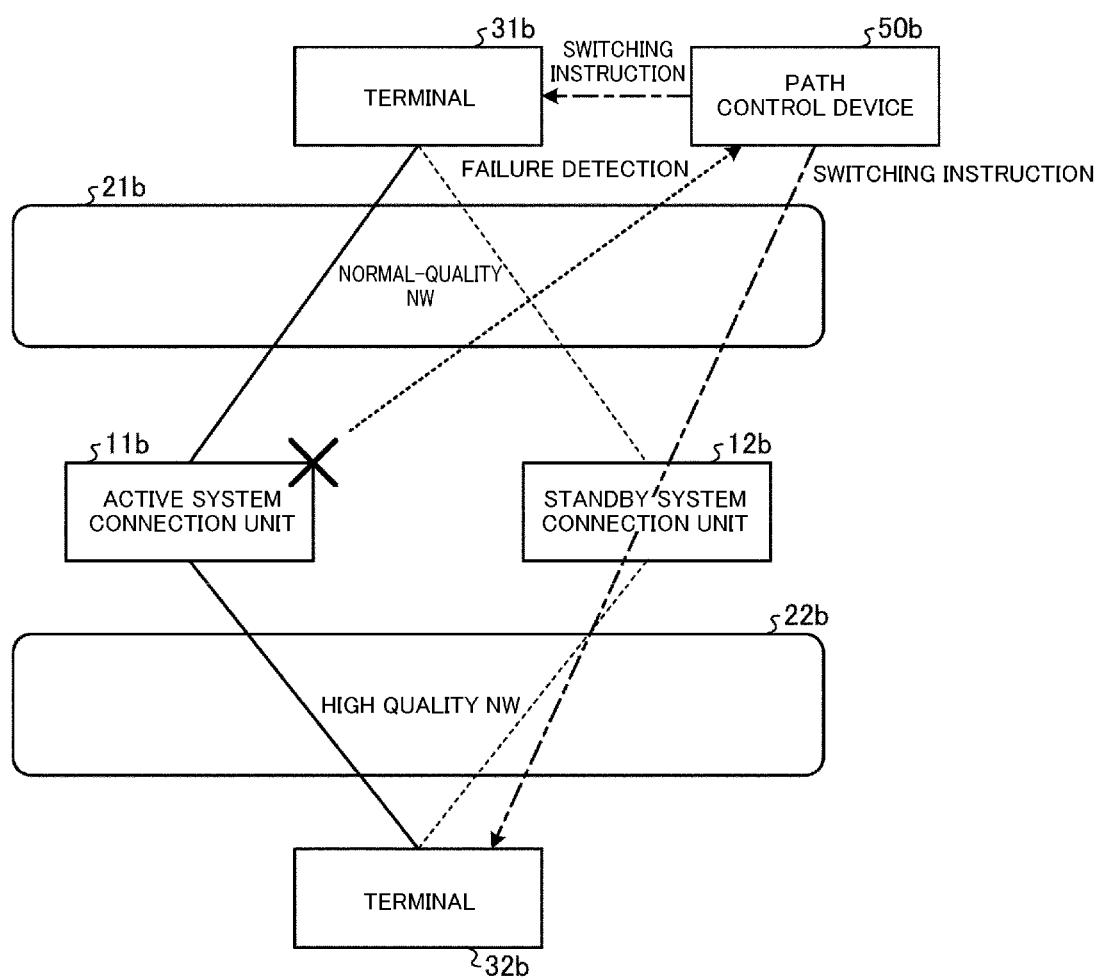
FIG. 12 is a diagram showing a conventional communication control system.

FIG. 12 is a diagram showing a conventional communication control system. As shown in FIG. 12, a terminal 31$b$ and a terminal 32$b$ are communicatively connected via a normal-quality NW 21$b$ and a high-quality NW 22$b$. The normal-quality NW 21$b$ and the high-quality NW 22$b$ are connected via an active system connection unit 11$b$ or a standby system connection unit 12$b$.

In the example shown in FIG. 12, a path control device 50$b$ detects a failure of a path passing through the active system connection unit 11$b$, and instructs the terminal 31$b$ and the terminal 32$b$ to switch the system.

Here, the terminal 31$b$ and the terminal 32$b$ are devices owned by the subscriber, and as in the above example, the subscriber can use a maximum of twice the contract band on the high-quality NW 22$b$ by setting the static distribution of communication to the standby system connection unit 12$b$ even when no failure occurs.

Figure 13:
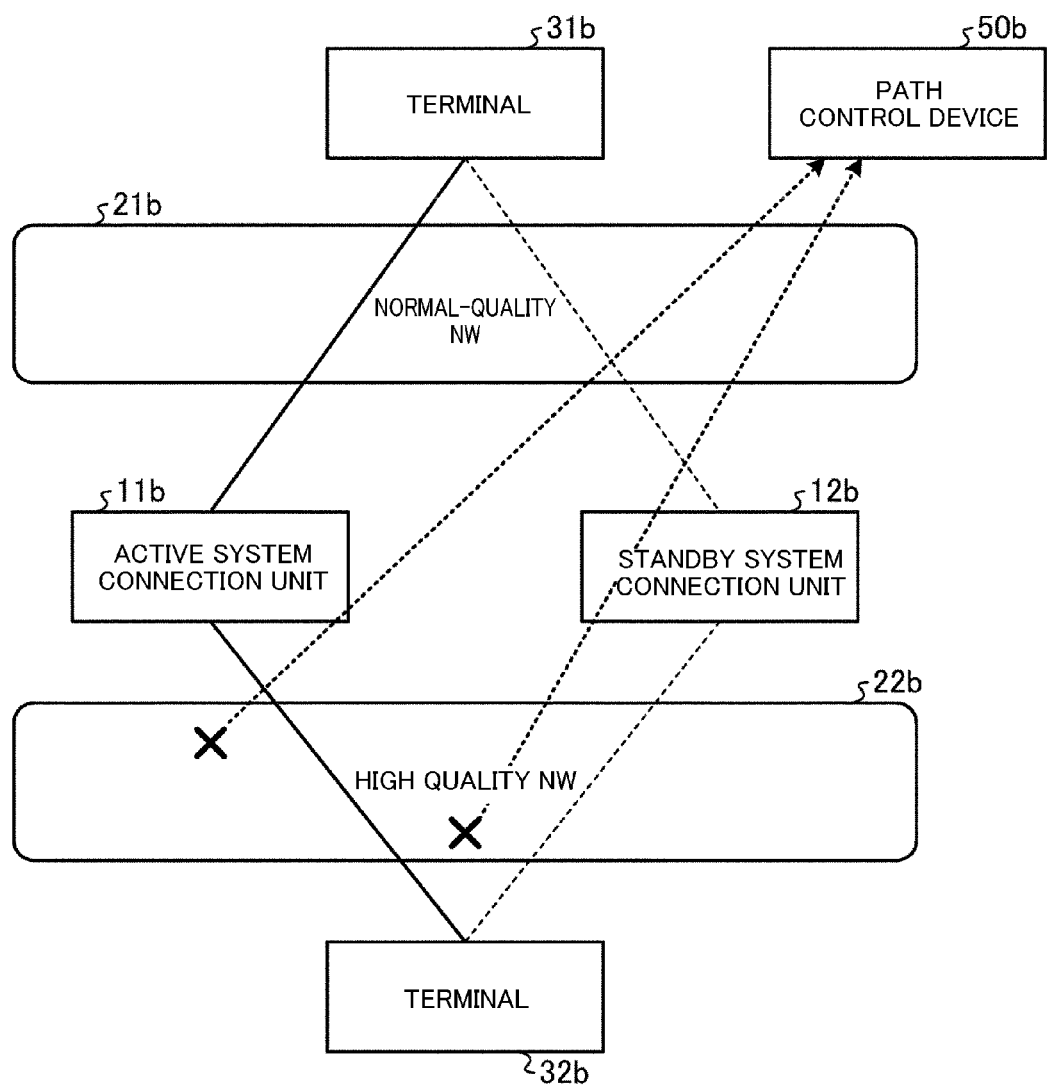
FIG. 13 is a diagram showing a conventional communication control system.

In the example shown in FIG. 12, since the path control is performed via the path control device 50$b$ after the failure detection, there is a problem that it takes time to restore the communication. Furthermore, as shown in FIG. 13, there is a likelihood that a case where the path control device 50$b$ cannot specify communication interruption occurs because of a wide variety of failure patterns causing communication interruption. FIG. 13 is a diagram showing a conventional communication control system.

Since a device such as the path control device 50$b$ is required, the pattern of the failure to be considered is increased and the development cost of the software is increased.

First Embodiment

Figure 2:
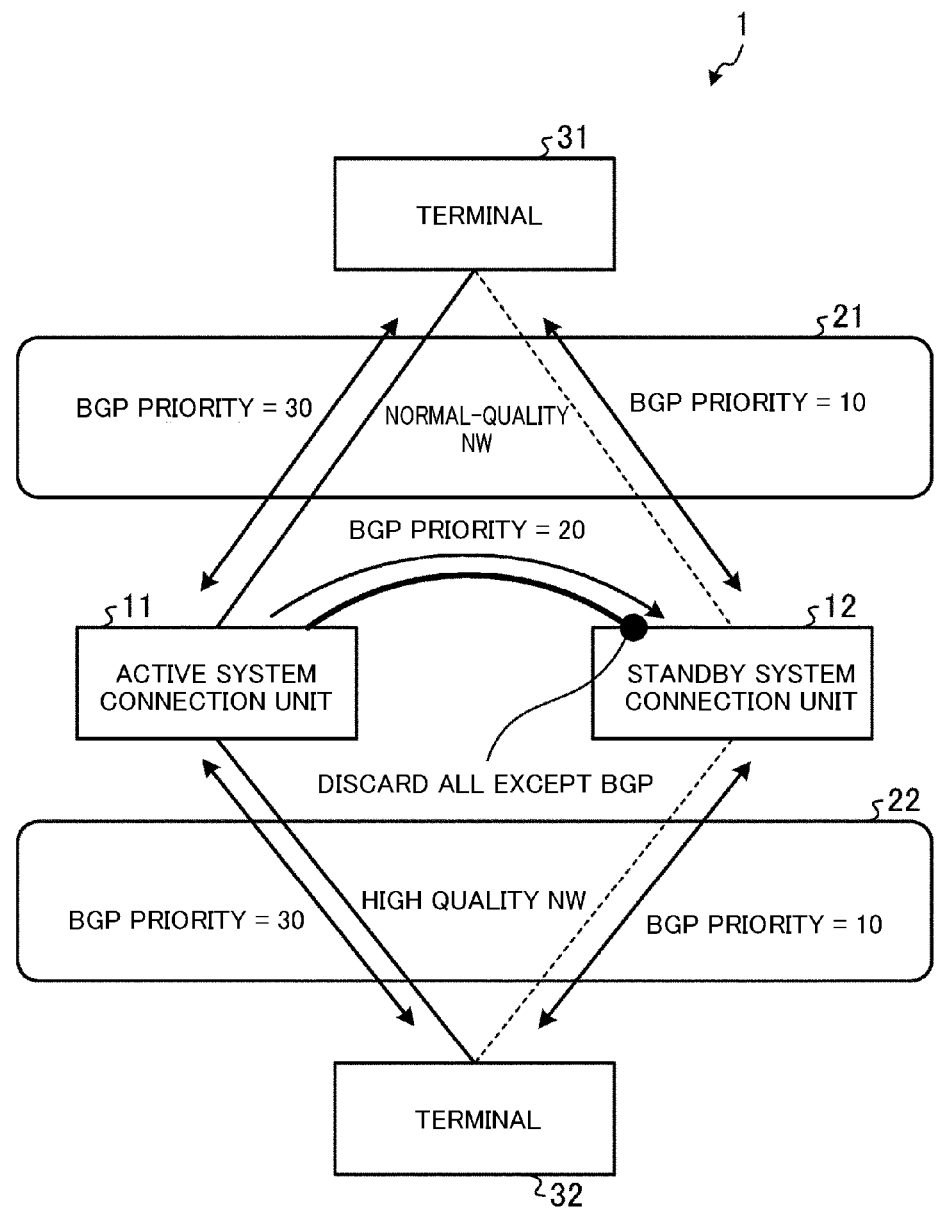
FIG. 2 is a diagram illustrating an example of a configuration of a communication control system according to a first embodiment.

FIG. 2 is a diagram illustrating an example of a configuration of a communication control system according to a first embodiment. As shown in FIG. 12, a terminal 31 and a terminal 32 are communicatively connected via a normal-quality NW 21 and a high-quality NW 22. The normal-quality NW 21 and the high-quality NW 22 are connected via an active system connection unit 11 or a standby system connection unit 12. The active system connection unit 11 and the standby system connection unit 12 are connected directly or via a tunnel.

Here, a communication control system 1 functions as a setting unit and a discarding unit. Specifically, the active system connection unit 11, the standby system connection unit 12, or a path control device (not shown) corresponds to the setting unit. The path control device instructs the active system connection unit 11 and the standby system connection unit 12 to transmit a path advertisement of a BGP or the like. The standby system connection unit 12 corresponds to the discarding unit.

Here, it is assumed that a priority of the BGP is set by the path advertisement by the active system connection unit 11 or the standby system connection unit 12.

The active system connection unit 11 sets a first priority as a priority of a BGP in a path connecting from the terminal 31 to the terminal 32 through the active system connection unit 11. In addition, the standby system connection unit 12 sets a second priority lower than the first priority as a priority of a BGP in a path connecting from the terminal 31 to the terminal 32 through the standby system connection unit 12.

Further, the active system connection unit 11 sets a third priority which is lower than the first priority and higher than the second priority as a priority of a BGP in a path connecting the active system connection unit 11 and the standby system connection unit 12.

In the example shown in FIG. 2, the first priority is 30. The second priority is 10. The third priority is 20. In this way, the third priority may be intermediate (average) between the first priority and the second priority.

As a result, the first priority is set as the priority of the BGP in the path between the active system connection unit 11 and the terminal 31. In addition, the first priority is set as the priority of the BGP in the path between the active system connection unit 11 and the terminal 32.

In addition, the second priority lower than the first priority is set as the priority of the BGP in the path between the standby system connection unit 12 and the terminal 31. In addition, the second priority is set as the priority of the BGP in the path between the standby system connection unit 12 and the terminal 32.

Further, the third priority which is lower than the first priority and higher than the second priority is set as the priority of the BGP in the path between the active system connection unit 11 and the standby system connection unit 12.

Furthermore, the active system connection unit 11 may discard traffic other than the BGP among traffic from the active system connection unit 11 to the standby system connection unit 12. For example, discarding of the traffic is performed in the interface of the standby system connection unit 12.

The path advertisement from the standby system connection unit 12 to the active system connection unit 11 is not performed. Also, the standby system connection unit 12 discards traffic other than the BGP among traffic from the standby system connection unit 12 to the active system connection unit 11.

In the following description, a path (regardless of direction) connecting from the terminal 31 to the terminal 32 through the active system connection unit 11 may be referred to as an active system. Also, a path (regardless of direction) connecting from the terminal 31 to the terminal 32 through the standby system connection unit 12 may be referred to as a standby system.

Figure 3:
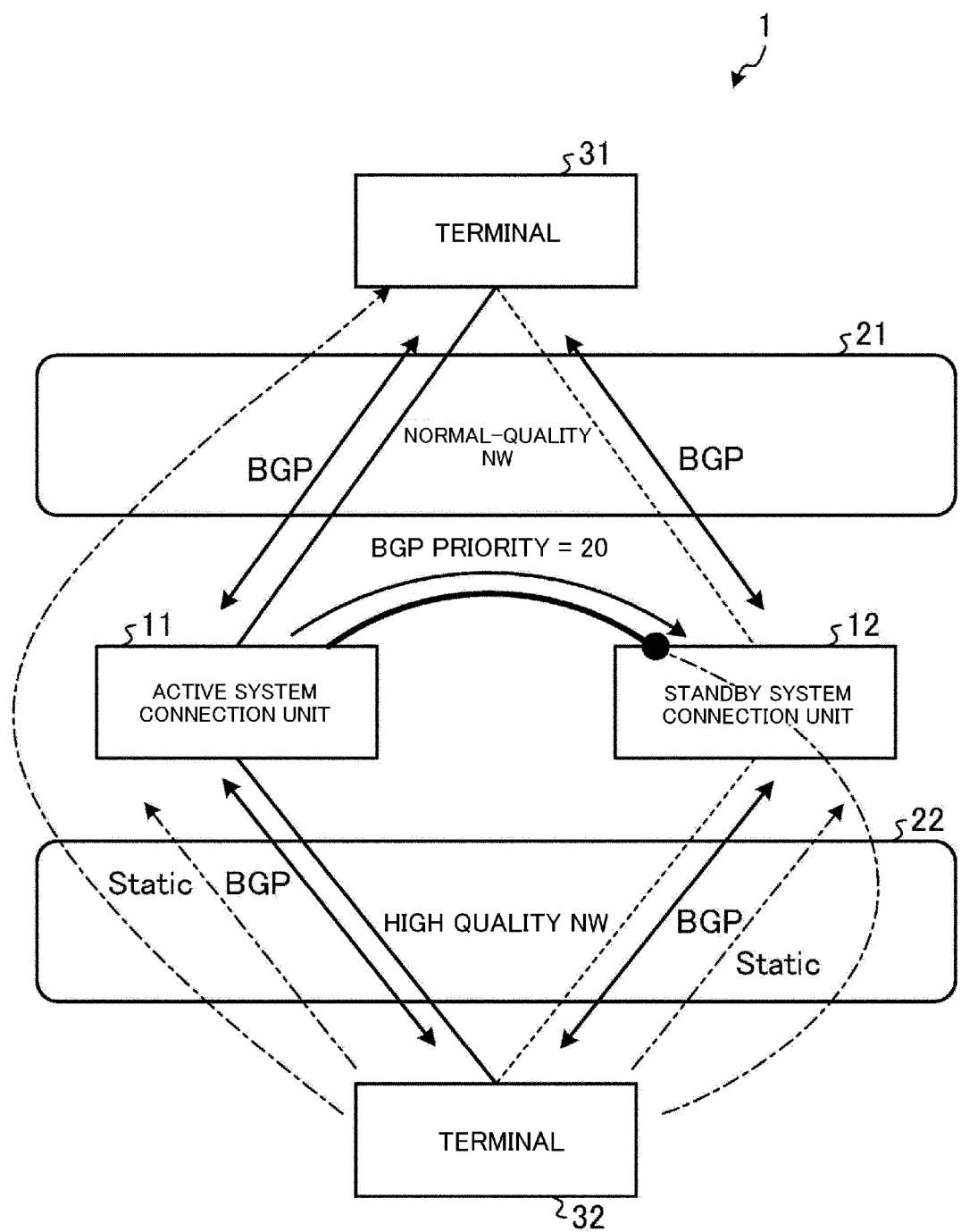
FIG. 3 is a diagram illustrating an operation of the communication control system during normal operation.

FIG. 3 is a diagram illustrating the operation of the communication control system during normal operation. As shown in FIG. 3, even when static setting is performed from the terminal 32 to use both the active system connection unit 11 and the standby system connection unit 12, the path of the standby system is not used during normal operation because the priority (20) of the path between the standby system connection unit 12 and the active system connection unit 11 is higher than the priority (10) of the path between the standby system connection unit 12 and the terminal 31.

Figure 4:
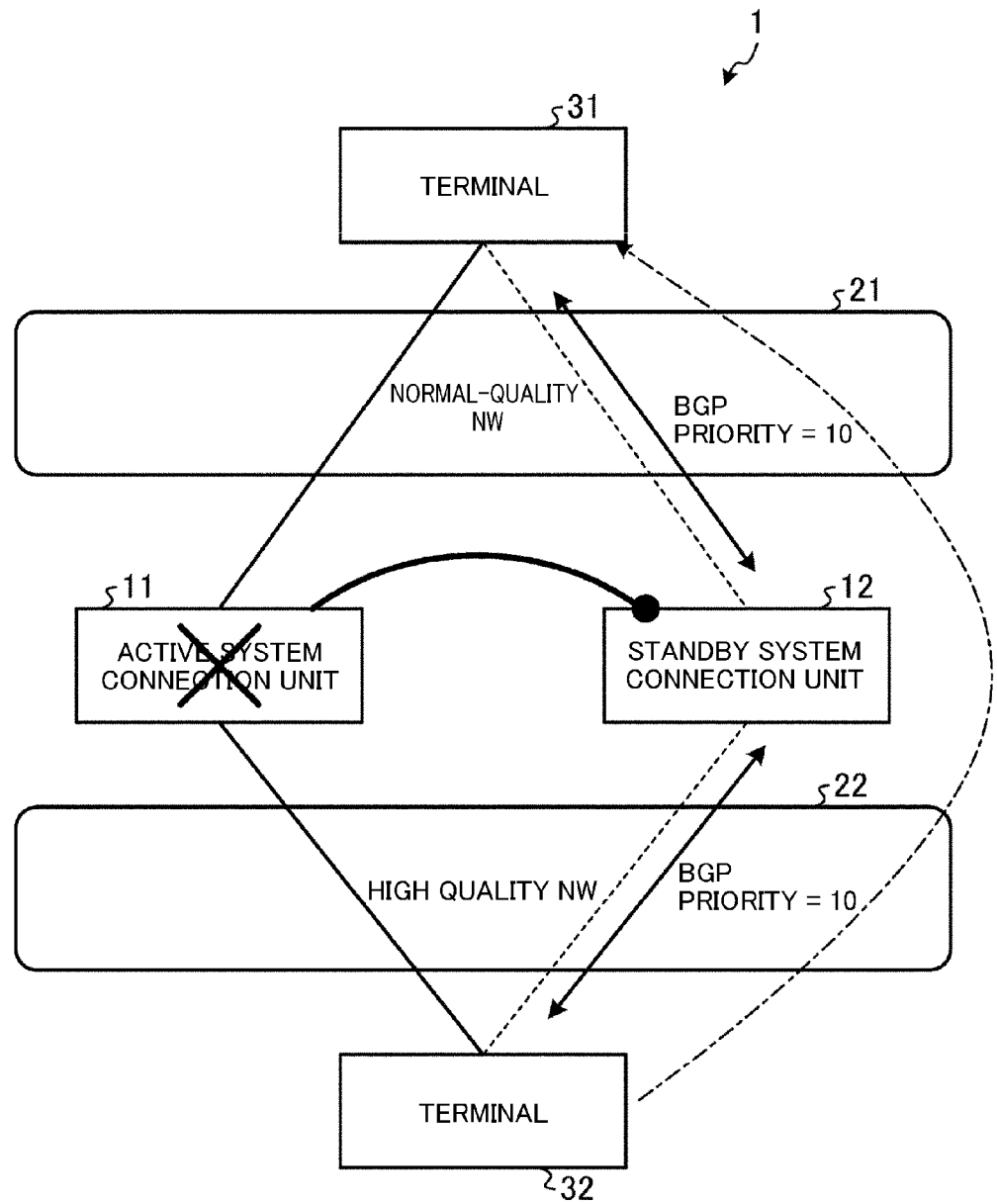
FIG. 4 is a diagram illustrating an operation of the communication control system when a failure occurs.

Furthermore, the communication control system 1 can autonomously switch paths when a failure occurs. As shown in FIG. 4, when a failure occurs in the active system connection unit 11 and the active system cannot be used, path information of the BGP between the active system connection unit 11 and the standby system connection unit 12 disappears, and the standby system is used for communication between the terminal 31 and the terminal 32. FIG. 4 is a diagram illustrating the operation of the communication control system when a failure occurs.

Figure 5:
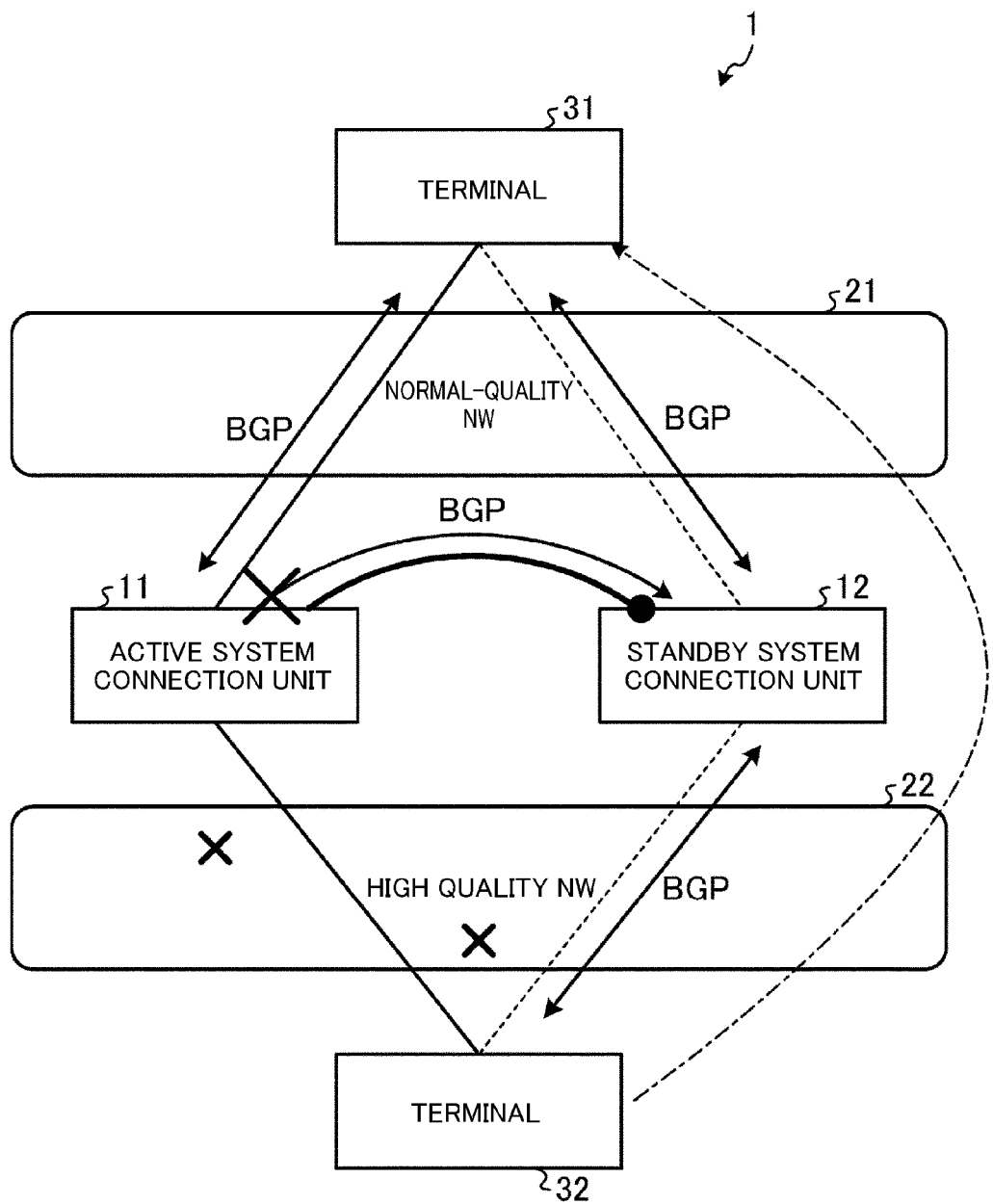
FIG. 5 is a diagram illustrating an operation of the communication control system when a failure occurs.

On the other hand, a case where a failure occurs in a part of the active system connection unit 11 may be considered. For example, as shown in FIG. 5, there may be a case in which the path between the active system connection unit 11 and the terminal 32 cannot be used, but the path between the active system connection unit 11 and the terminal 31 can be used. FIG. 5 is a diagram illustrating the operation of the communication control system when a failure occurs.

When at least a part of the path passing through the active system connection unit 11 is lost, the active system connection unit 11 sets the priority of the BGP in the path connecting the active system connection unit 11 and the standby system connection unit 12 to a fourth priority lower than the second priority.

For example, the active system connection unit 11 lowers the priority of the BGP in the path connecting the active system connection unit 11 and the standby system connection unit 12 from 20 to 5. In this case, the fourth priority is 5. As a result, the standby system is used in accordance with the priority for communication between the terminal 31 and the terminal 32.

Further, when at least a part of the path passing through the active system connection unit 11 is lost, the active system connection unit 11 may disconnect the path connecting the active system connection unit 11 and the standby system connection unit 12. As a result, the standby system is inevitably used for communication between the terminal 31 and the terminal 32.

Figure 6:
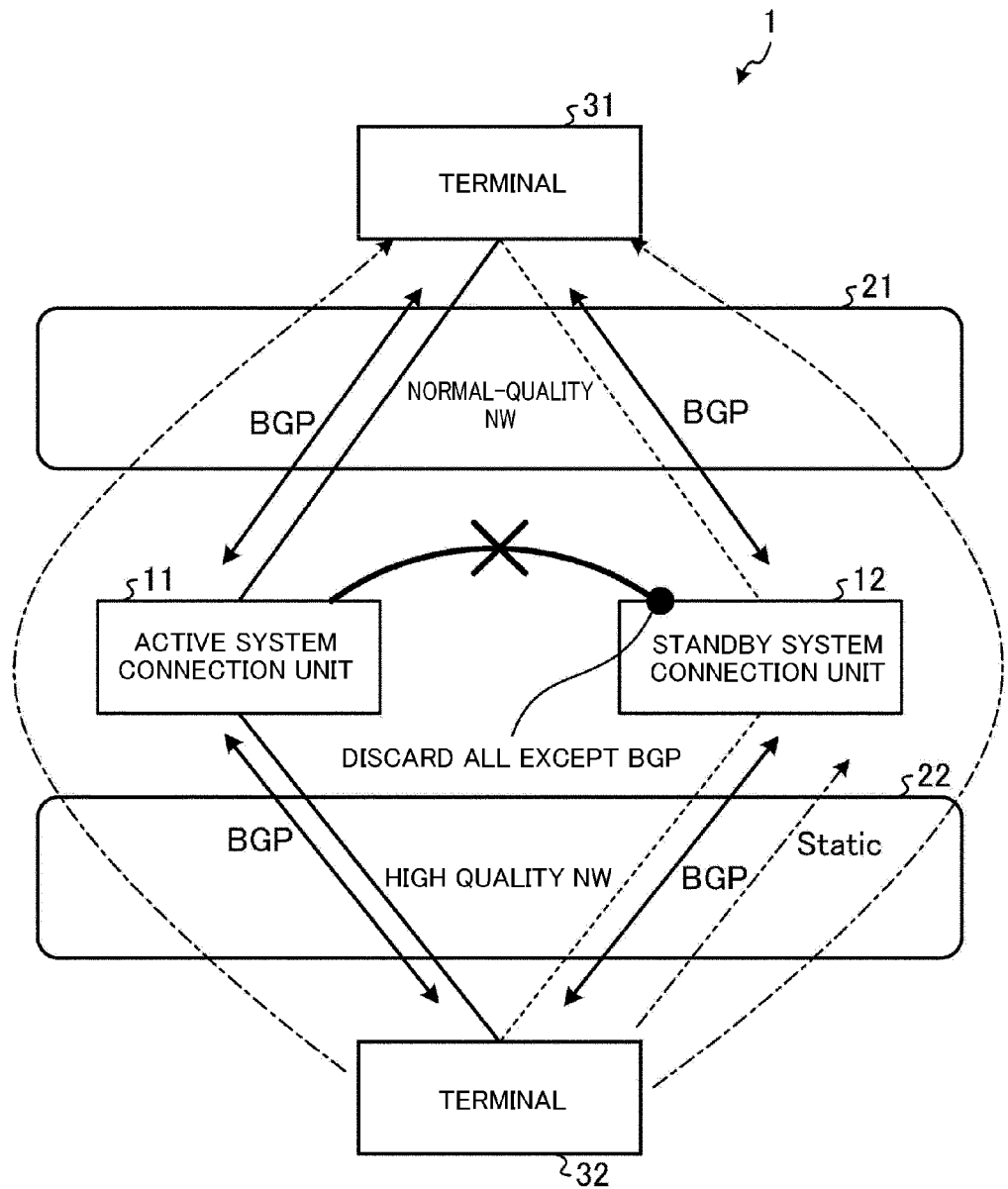
FIG. 6 is a diagram illustrating an operation of the communication control system when a failure occurs.

As shown in FIG. 6, when a failure occurs in the path connecting the active system connection unit 11 and the standby system connection unit 12, the standby system becomes temporarily available, but in this case, there is no problem such that the destination of traffic originally flowing in the active system becomes unknown. FIG. 6 is a diagram illustrating the operation of the communication control system when a failure occurs.

Since the failure information of the path connecting the active system connection unit 11 and the standby system connection unit 12 does not propagate to the subscriber's terminal, it is practically impossible to use the standby system in case of a failure. Also, in the high-quality service, device exchange or the like is performed in a relatively short time of several tens of minutes to several hours, and the failure is immediately restored, so that the effect of suppressing the unpermitted use of the standby system is not lost.

Figure 7:
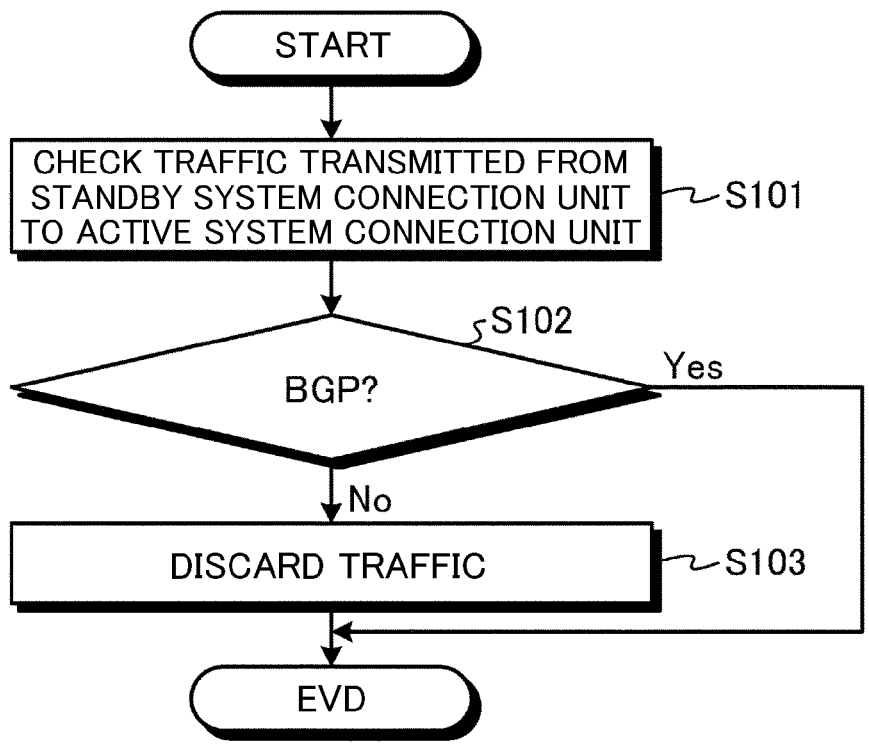
FIG. 7 is a flowchart showing a flow of processing of the communication control system.
Figure 8:
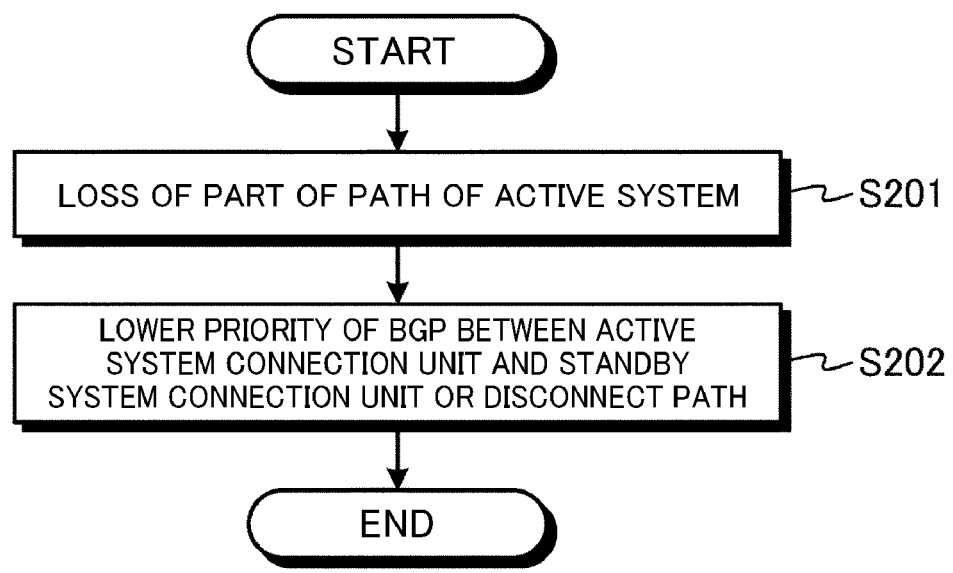
FIG. 8 is a flowchart showing a flow of processing of the communication control system.

The flow of processing of the communication control system 1 will be described with reference to FIGS. 7 and 8. FIGS. 7 and 8 are flowcharts showing a flow of processing of the communication control system.

As shown in FIG. 7, first, the standby system connection unit 12 checks traffic transmitted from the standby system connection unit 12 to the active system connection unit 11 (step S101), and determines whether or not the traffic is a BGP (step S102).

The standby system connection unit 12 discards the traffic (step S103) when it is determined that the traffic transmitted to the active system connection unit 11 is not a BGP (step S102, No). On the other hand, the standby system connection unit 12 does not discard the traffic when it is determined that the traffic transmitted to the active system connection unit 11 is a BGP (step S102, Yes).

With reference to FIG. 8, the flow of processing when a failure occurs will be described. As shown in FIG. 8, when detecting loss of a part of the path of the active system (step S201), the active system connection unit 11 lowers the priority of BGP between the active system connection unit 11 and the standby system connection unit 12 or disconnects the path between the active system connection unit 11 and the standby system connection unit 12 (step S202).

Effects of First Embodiment

As described above, the setting unit sets a first priority as a priority of a BGP in a path connecting from the terminal 31 to the terminal 32 through the active system connection unit 11, sets a second priority lower than the first priority as a priority of a BGP in a path connecting from the terminal 31 to the terminal 32 through the standby system connection unit 12, and sets a third priority which is lower than the first priority and higher than the second priority as a priority of a BGP in a path connecting the active system connection unit 11 and the standby system connection unit 12. The discarding unit discards traffic other than a BGP among traffic from the active system connection unit 11 to the standby system connection unit 12.

Thus, according to the present embodiment, during normal operation, it is possible to prevent subscribers from establishing communications exceeding a contract band, thereby preventing the band from being used in an unauthorized manner.

Since the standby system connection unit 12 can discard communication during normal operation, from the subscriber's point of view, it seems like a device that cannot be used during normal operation. Thus, unexpected traffic from the service provider's point of view does not flow to the standby system. Therefore, the standby system connection unit 12 can accommodate the subscribers in a superimposed manner, and the cost burden per subscriber is reduced.

In the conventional service, in order to prevent unfairness such as being used by a specific subscriber without permission, there are many forms in which a contract is made for two active system connection units and one unit is used as a standby system for the use of the subscriber. In this case, from the subscriber's point of view, it seems that the same cost burden is borne by the active system connection unit and the standby system connection unit. On the other hand, in the present embodiment, the cost burden can be proportionally divided.

When at least a part of the path passing through the active system connection unit 11 is lost, the setting unit sets the priority of the BGP in the path connecting the active system connection unit 11 and the standby system connection unit 12 to a fourth priority lower than the second priority. Further, when at least a part of the path passing through the active system connection unit 11 is lost, the setting unit disconnects the path connecting the active system connection unit 11 and the standby system connection unit 12.

By using only information normally handled by the active system connection unit 11, and by making the active system inoperable due to a failure, the standby system can be changed to an available state by path switching in the standby system. Since the system switching is performed by the failure of the active system connection unit 11 or the independent and autonomous determination only by the active system connection unit 11, unlike the determination by the path control device or the standby system device, very high speed is achieved and erroneous determination does not occur.

Usually, when communication is performed between the active system and the standby system, a means such as redundancy is required so that the communication is not disconnected due to a failure or the like in the middle of the path. In the present embodiment, since the communication between the active system connection unit 11 and the standby system connection unit 12 is used only for pulling in and discarding unauthorized traffic, the communication using the standby system becomes temporarily available when the communication between the active system connection unit 11 and the standby system connection unit 12 is interrupted.

Therefore, erroneous pull-in or the like of normal traffic does not occur. In addition, when the frequency of failures and the restoration time are taken into consideration, the timing at which unauthorized use is possible is indefinite and infrequent, and further the time is short and only a small percentage of the operating time. Therefore, it is difficult to suppose unauthorized use during that time, and it can be practically ignored.

In addition, traffic used for communication is only a BGP having a very small amount of communication, a special communication path such as a large capacity or a high reliability is not required, and the cost of the communication path can be ignored because it can be superimposed on other communication.

[System Configuration and Others]

Further, each component of each illustrated device is a functional conceptual component and does not necessarily need to be physically configured as illustrated in the drawings. That is, a specific form of distribution and integration of the respective devices is not limited to the form illustrated in the drawings, and all or some of the devices can be distributed or integrated functionally or physically in any units according to various loads, and use situations. Further, all or some of processing functions to be performed in each device can be realized by a central processing unit (CPU) and a program analyzed and executed by the CPU, or can be realized as hardware using a wired logic. The program may be executed not only by the CPU but also by another processor such as a GPU.

Further, among processing operations described in the present embodiment, all or some of processing operations described as being automatically performed can be manually performed, or all or some of processing operations described as being manually performed can be automatically performed by a known method. In addition, the processing procedure, the control procedure, specific names, information including various types of data and parameters that are shown in the above document and drawings may be arbitrarily changed unless otherwise described.

[Program]

As one embodiment, the communication control device 20 can be implemented by installing a communication control program which executes the above learning processing as package software or online software on a desired computer. For example, an information processing device can be constituted to function as the communication control device 20 by causing the information processing device to execute the above communication control program. The information processing device mentioned herein includes a desktop type or notebook type personal computer. In addition, information processing devices include smartphones, mobile communication terminals such as mobile phones and personal handyphone systems (PHSs), and slate terminals such as personal digital assistants (PDAs).

Figure 9:
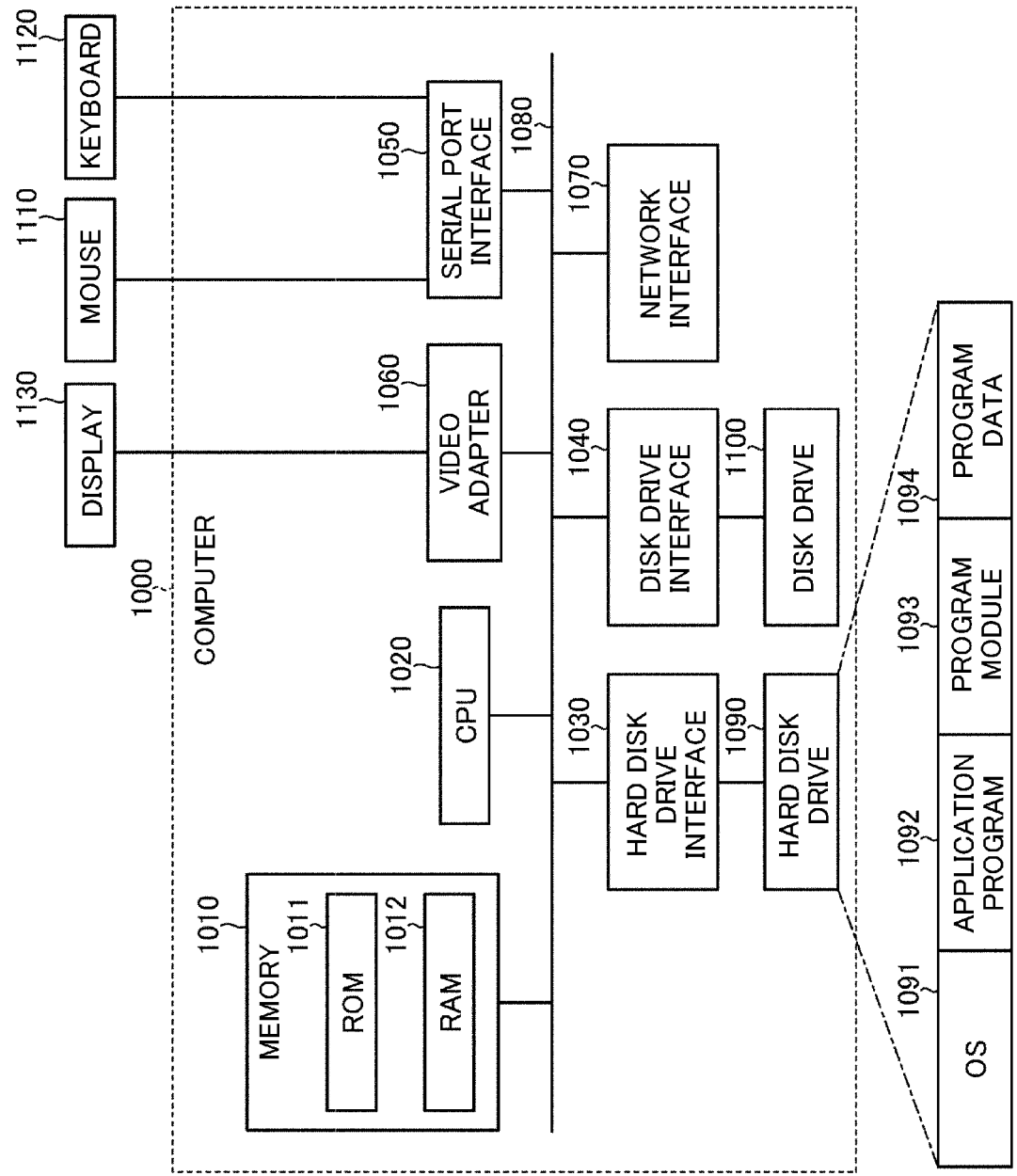
FIG. 9 is a diagram showing an example of a computer that executes a communication control program.

FIG. 9 is a diagram showing an example of a computer that executes the communication control program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program, such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines each process of the communication control device 20 is implemented as the program module 1093 in which a code that can be executed by the computer is described. The program module 1093 is stored in, for example, the hard disk drive 1090. For example, the program module 1093 for executing the same processing as the functional configuration in the communication control device 20 is stored in the hard disk drive 1090. Note that the hard disk drive 1090 may be replaced with a solid state drive (SSD).

Furthermore, the setting data used in the processing of the above-described embodiment is stored, for example, in the memory 1010 or the hard disk drive 1090 as the program data 1094. The CPU 1020 reads the program module 1093 or the program data 1094 stored in the memory 1010 or the hard disk drive 1090 into the RAM 1012 as necessary, and executes the processing of the above-described embodiment.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), a wide area network (WAN), and the like). Then, the program module 1093 and the program data 1094 may be read by the CPU 1020 from another computer via the network interface 1070.

REFERENCE SIGNS LIST

1 Communication control system
11 Active system connection unit
12 Standby system connection unit
21 Normal-quality NW
22 High-quality NW
31, 32 Terminal

The invention claimed is:

1. A communication control device comprising one or more processors configured to perform operations comprising:
setting a first priority as a priority of a border gateway protocol (BGP) in a first path connecting from a first terminal to a second terminal through an active system connection unit;
setting a second priority lower than the first priority as a priority of a BGP in a second path connecting from the first terminal to the second terminal through a standby system connection unit;
setting a third priority which is lower than the first priority and higher than the second priority as a priority of a BGP in a third path connecting the active system connection unit and the standby system connection unit;
discarding traffic other than a BGP among traffic from the standby system connection unit to the active system connection unit;
determining that a failure occurred where at least a part of the first path passing through the active system connection unit is lost; and
in response to determining that the failure occurred, setting the priority of the BGP in the third path connecting the active system connection unit and the standby system connection unit to a fourth priority lower than the second priority.

2. The communication control device according to claim 1, wherein the operations comprise:
when a second failure occurred where at least a part of the first path passing through the active system connection unit is lost, disconnecting the third path connecting the active system connection unit and the standby system connection unit.

3. A communication control method executed by a communication control device, the communication control method comprising:
setting a first priority as a priority of a border gateway protocol (BGP) in a first path connecting from a first terminal to a second terminal through an active system connection unit;
setting a second priority lower than the first priority as a priority of a BGP in a second path connecting from the first terminal to the second terminal through a standby system connection unit;
setting a third priority which is lower than the first priority and higher than the second priority as a priority of a BGP in a third path connecting the active system connection unit and the standby system connection unit;
discarding traffic other than a BGP among traffic from the standby system connection unit to the active system connection unit;
determining that a failure occurred where at least a part of the first path passing through the active system connection unit is lost; and
in response to determining that the failure occurred, setting the priority of the BGP in the third path connecting the active system connection unit and the standby system connection unit to a fourth priority lower than the second priority.

4. A non-transitory computer readable medium storing one or more instructions causing a computer to function as the communication control device according to claim 1.

5. A communication control system comprising: an active system connection unit, including one or more processors, configured to connect a first terminal and a second terminal; and a standby system connection unit, including one or more processors, configured to connect the first terminal and the second terminal,
wherein: a first priority is set as a priority of a border gateway protocol (BGP) in a first path connecting the active system connection unit and the first terminal,
the first priority is set as a priority of a BGP in the first path connecting the active system connection unit and the second terminal,
a second priority lower than the first priority is set as a priority of a BGP in a second path connecting the standby system connection unit and the first terminal,
the second priority is set as a priority of a BGP in the second path connecting the standby system connection unit and the second terminal,
a third priority which is lower than the first priority and higher than the second priority is set as a priority of a BGP in a third path between the active system connection unit and the standby system connection unit,
the standby system connection unit discards traffic other than a BGP among traffic to the active system connection unit
when a failure occurred where at least a part of the first path passing through the active system connection unit is lost, the third priority of the BGP in the third path is set to a fourth priority lower than the second priority.

6. The communication control method according to claim 3, comprising:
when a second failure occurred where at least a part of the first path passing through the active system connection unit is lost, disconnecting the third path connecting the active system connection unit and the standby system connection unit.

7. The communication control system according to claim 5, wherein, when a second failure occurred where at least a part of the first path passing through the active system connection unit is lost, the third path connecting the active system connection unit and the standby system connection unit is disconnected.

* * * * *